(12) United States Patent
Maeto (10) Patent No.: US 11,322,181 B2
(45) Date of Patent: May 3, 2022

(54) MAGNETIC DISK DEVICE AND READ PROCESSING METHOD

(71) Applicants: Kabushiki Kaisha Toshiba, Tokyo (JP); Toshiba Electronic Devices & Storage Corporation, Tokyo (JP)

(72) Inventor: Nobuhiro Maeto, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/174,459

(22) Filed: Feb. 12, 2021

(65) Prior Publication Data

US 2021/0398561 A1 Dec. 23, 2021

(30) Foreign Application Priority Data

Jun. 23, 2020 (JP) .............................. JP2020-107839

(51) Int. Cl.
| | | |
|---|---|---|
| G11B 5/54 | (2006.01) | |
| G11B 27/36 | (2006.01) | |
| G11B 21/08 | (2006.01) | |
| G11B 5/012 | (2006.01) | |

(52) U.S. Cl.
CPC ............ G11B 21/083 (2013.01); G11B 5/012 (2013.01)

(58) Field of Classification Search
CPC ............ G11B 5/5526; G11B 20/10231; G11B 20/10009; G11B 5/09; G11B 2220/90; G11B 2220/20; G11B 27/36; G11B 27/3027; G11B 5/012; G11B 19/02; G11B 19/00; G11B 20/10; G11B 20/10388; G11B 20/10472
USPC ................ 360/31, 75, 39, 48, 65, 46, 68, 53
See application file for complete search history.

(56) References Cited

U.S. PATENT DOCUMENTS

| | | | |
|---|---|---|---|
| 8,054,576 B2 * | 11/2011 | Bui ......................... | G11B 5/584 |
| | | | 360/77.12 |
| 9,318,137 B1 | 4/2016 | Chan et al. | |
| 9,928,872 B1 | 3/2018 | Jury | |
| 10,014,026 B1 * | 7/2018 | Wu .................. | G11B 20/10222 |
| 2010/0290151 A1 | 11/2010 | Kondo et al. | |

* cited by examiner

*Primary Examiner* — Nabil Z Hindi
(74) *Attorney, Agent, or Firm* — Allen & Overy LLP (57) ABSTRACT

According to one embodiment, a magnetic disk device includes a disk, a head including a write head and a first read head and a second read head, and a controller that disposes the first read head at a first radial position of a first track of the disk in a radial direction to read the first track, changes a main read head which serves as a reference for positioning during a read process from the first read head to the second read head when read retrying the first track, disposes the second read head as the main read head at a second radial position different from the first radial position of the first track in the radial direction to read the first track, and changes an internal setting corresponding to the main read head to read the first track.

20 Claims, 9 Drawing Sheets

MAGNETIC DISK DEVICE AND READ PROCESSING METHOD

CROSS-REFERENCE TO RELATED APPLICATIONS

This application is based upon and claims the benefit of priority from Japanese Patent Application No. 2020-107839, filed Jun. 23, 2020, the entire contents of which are incorporated herein by reference.

FIELD

Embodiments described herein relate generally to a magnetic disk device and a read processing method.

BACKGROUND

In the magnetic disk device, a track (hereinafter, referred to as an adjacent track) adjacent to a particular track in the radial direction is close to or overlap the particular track, so that a track per inch (TPI) of the particular track can be reduced. In recent years, a two-dimensional magnetic recording (TDMR) type magnetic disk device having a plurality of read heads has been developed. In the TDMR type magnetic disk device, for example, when reading a track which an adjacent track is close to or overlaps, it is possible to improve the data decoding performance by adjusting the arrangement of a read head (hereinafter referred to as a main read head) that serves as a reference for positioning during a read process among a plurality of read heads, and the arrangement of a read head (hereinafter referred to as a sub read head) other than the main read head among the plurality of read heads.

DETAILED DESCRIPTION

In general, according to one embodiment, a magnetic disk device comprises: a disk; a head including a write head that writes data to the disk and a first read head and a second read head that read data from the disk; and a controller that disposes the first read head at a first radial position of a first track of the disk in a radial direction to read the first track, changes a main read head which serves as a reference for positioning during a read process from the first read head to the second read head when read retrying the first track, disposes the second read head as the main read head at a second radial position different from the first radial position of the first track in the radial direction to read the first track, and changes an internal setting corresponding to the main read head to read the first track.

Hereinafter, embodiments will be described with reference to the drawings. It should be noted that the drawings are merely examples and do not limit the scope of the invention.

(Embodiment)

Figure 1:
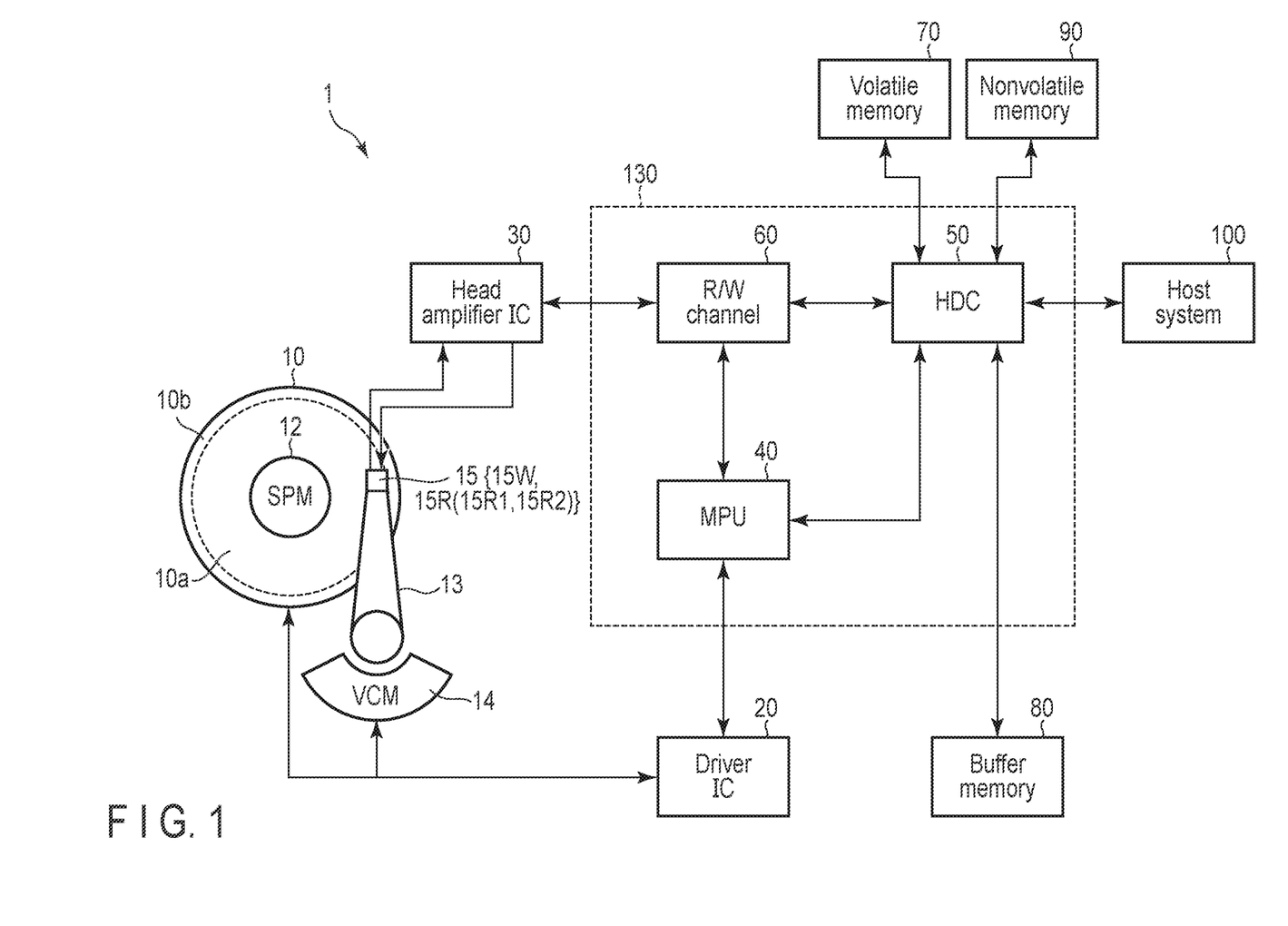
FIG. 1 is a block diagram showing a configuration of a magnetic disk device according to an embodiment.

FIG. 1 is a block diagram showing a configuration of the magnetic disk device 1 according to an embodiment.

The magnetic disk device 1 includes a head disk assembly (HDA) described later, a driver IC 20, a head amplifier integrated circuit (hereinafter referred to as a head amplifier IC or a preamplifier) 30, a volatile memory 70, a buffer memory (Buffer) 80, a nonvolatile memory 90, and a system controller 130 which is an integrated circuit of one chip. Further, the magnetic disk device 1 is connected to a host system (host) 100. The magnetic disk device 1 is, for example, a two-dimensional magnetic recording (TDMR) type magnetic disk device.

The HDA includes a magnetic disk (hereinafter referred to as a disk) 10, a spindle motor (SPM) 12, an arm 13 on which a head 15 is mounted, and a voice coil motor (VCM) 14. The disk 10 is attached to a spindle motor 12 and rotates by driving the spindle motor 12. The arm 13 and the VCM 14 constitute an actuator. The actuator controls the movement of the head 15 mounted on the arm 13 to a particular position on the disk 10 by driving the VCM 14. The number of the disks 10 and the heads 15 may be two or more.

In the disk 10, a user data region 10a that can be used by a user in a region in which the data can be written, and a system area 10b for writing information necessary for system management are allocated. Hereinafter, the direction along the circumference of the disk 10 is referred to as a circumferential direction, and the direction intersecting the circumferential direction is referred to as a radial direction. A particular circumferential position of the disk 10 may be referred to as a circumferential position, and a particular radial position of the disk 10 may be referred to as a radial position. In addition, the radial position and the circumferential position may be collectively referred to as a position. (The user data region 10a of) the disk 10 is divided into a plurality of regions (hereinafter, may be referred to as zones) for each particular range in the radial direction. The zone contains a plurality of tracks (cylinders). Also, the track includes a plurality of sectors. The "track" has various meanings such as one region of a plurality of radially divided regions of the disk 10, a path of the head 15 at a particular radial position of the disk 10, data for one lap of the disk 10 written at a particular radial position of the disk 10, data extending in the circumferential direction at a particular radial position of the disk 10, data written to the track, and the like. The term "sector" has various meanings such as one region of a plurality of regions obtained by dividing a track in the circumferential direction, data written at a particular position on the disk 10, data written to a sector, and the like. The "radial width of a particular track" is referred to as a "track width". The "radial width of a particular sector" is referred to as a "sector width". The "center position of the track width at a particular circumferential position of a particular track" may be referred to as a "track center", and the "line connecting the center of the track width at each circumferential position of a particular track" may be referred to as a "track center". For example, the "track center" corresponds to the center position of the sector width of a particular sector.

The head 15 has a slider as a main body, and has a write head 15W and a read head 15R mounted on the slider. The write head 15W writes data to the disk 10. The read head 15R reads the data recorded on the disk 10. The read head 15R has a plurality of read heads 15R, for example, two read heads 15R1 and 15R2. The read head 15R1 is provided, for example, at a position farthest from the write head 15W. Other than the read head 15R1, the read head 15R2 is provided, for example, at a position farthest from the write head 15W. In other words, the read head 15R2 is located between the write head 15W and the read head 15R1. The read head 15R may have three or more read heads. The plurality of read heads 15R, for example, the two read heads 15R1 and 15R2 may be collectively referred to as the read head 15R, and the plurality of read heads 15R, for example, any one of the read heads 15R1 and 15R2 is simply referred to as the read head 15R. Hereinafter, among the plurality of read heads 15R, the read head 15R which serves as a reference for positioning during the read process may be referred to as a main read head 15R. Further, the read head 15R other than the main read head 15R among the plurality of read heads 15R may be referred to as a sub read head 15R.

Figure 2:
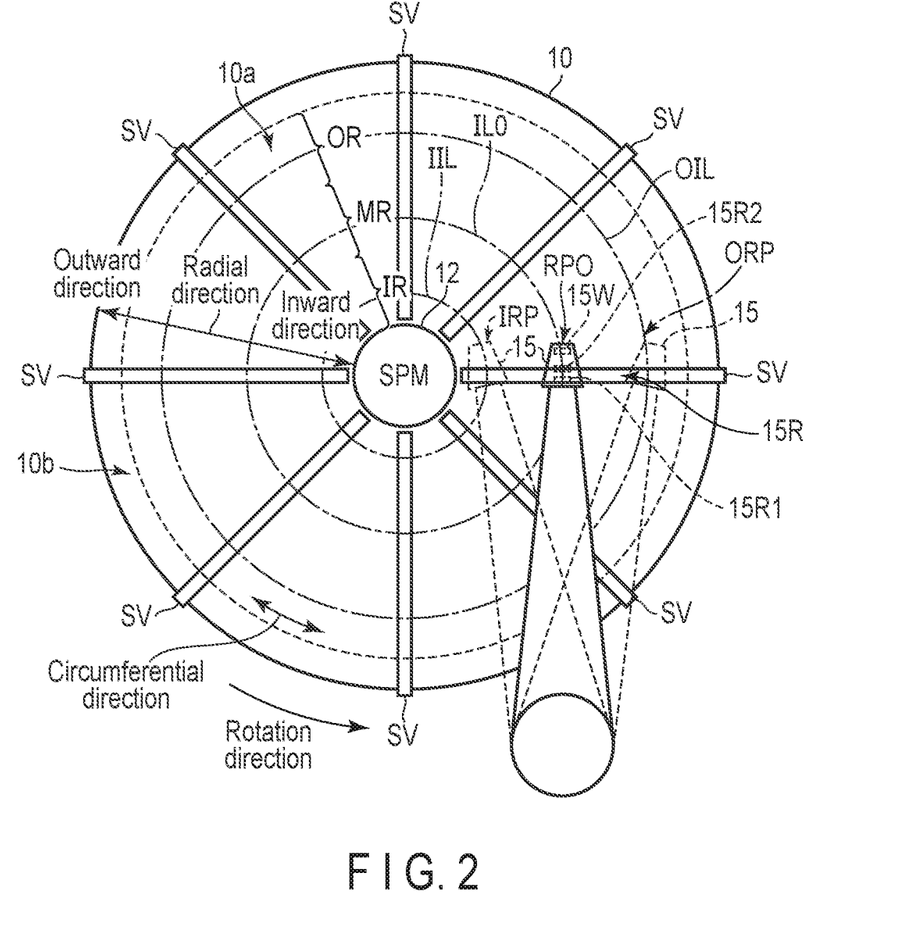
FIG. 2 is a schematic view showing an example of the arrangement of the head with respect to the disk according to the embodiment.

FIG. 2 is a schematic view showing an example of the arrangement of the head 15 with respect to the disk 10 according to the present embodiment. As shown in FIG. 2, the direction toward the outer circumference of the disk 10 in the radial direction is referred to as an outward direction (outside), and the direction opposite to the outward direction is referred to as an inward direction (inside). Further, as shown in FIG. 2, the direction in which the disk 10 rotates in the circumferential direction is referred to as a rotation direction. In the example shown in FIG. 2, the rotation direction is shown counterclockwise, but it may be in the opposite direction (clockwise). In FIG. 2, the user data region 10a is divided into an inner circumference region IR located in the inward direction, an outer circumference region OR located outward direction, and a middle circumference region MR located between the inner circumference region IR and the outer circumference region OR. In the example shown in FIG. 2, a radial position IRP, a radial position RP0, and a radial position ORP are shown. The radial position IRP is a position inward the radial position RP0, and the radial position ORP is a position outward the radial position RP0. In the example shown in FIG. 2, the radial position RP0 is in the middle circumference region MR, the radial position ORP is in the outer circumference region OR, and the radial position IRP is in the inner circumference region IR. The radial position RP0 may be in the outer circumference region OR or in the inner circumference region IR. The radial position IRPs may be located in the middle circumference region MR. FIG. 2 shows a path IIL passing through the radial position IRP, a path IL0 passing through the radial position RP0, and a path OIL passing through the radial position ORP. The paths IIL, OIL, and IL0 are disposed concentrically with respect to disk 10. For example, the paths IIL, OIL, and IL0 are each perfect circle. Hereinafter, a path disposed concentrically with respect to the disk 10 may be referred to as a target path.

The disk 10 has a plurality of servo patterns SV. Hereinafter, the servo pattern SV may be referred to as a servo sector or a servo region. The plurality of servo patterns SV radially extends in the radial direction of the disk 10 and is discretely disposed with a particular interval in the circumferential direction. The servo pattern SV includes servo data for positioning the head 15 at a particular radial position of the disk 10. Hereinafter, data other than the servo data written in the user data region other than the servo sector SV may be referred to as user data.

Servo data includes, for example, a servo mark, address data, burst data, and the like. The address data includes the address of a particular track (cylinder address) and the address of the servo sector of the particular track. The burst data is data (relative position data) used to detect a radial position shift (position error) of the head 15 with respect to the track center of a particular track, and has a repeating pattern having a particular period. The burst data is written in a staggered pattern across adjacent tracks to the outside. Here, "adjacent" includes not only a state in which data, objects, regions, spaces are in contact with each other or, and are disposed so as to be in contact with each other, but also that a state in which they are continuously disposed at particular intervals.

When the head 15 is located at the radial position RP0, the skew angle is, for example, 0°. Hereinafter, the radial position RP0 may be referred to as the reference position RP0. When the head 15 is located at the radial position ORP, the skew angle is, for example, a positive value. When the head 15 is located at the radial position IRP, the skew angle will be, for example, a negative value. When the head 15 is located at the radial position ORP, the skew angle may be a negative value. Further, when the head 15 is located at the radial position IRP, the skew angle may be a positive value.

Figure 3:
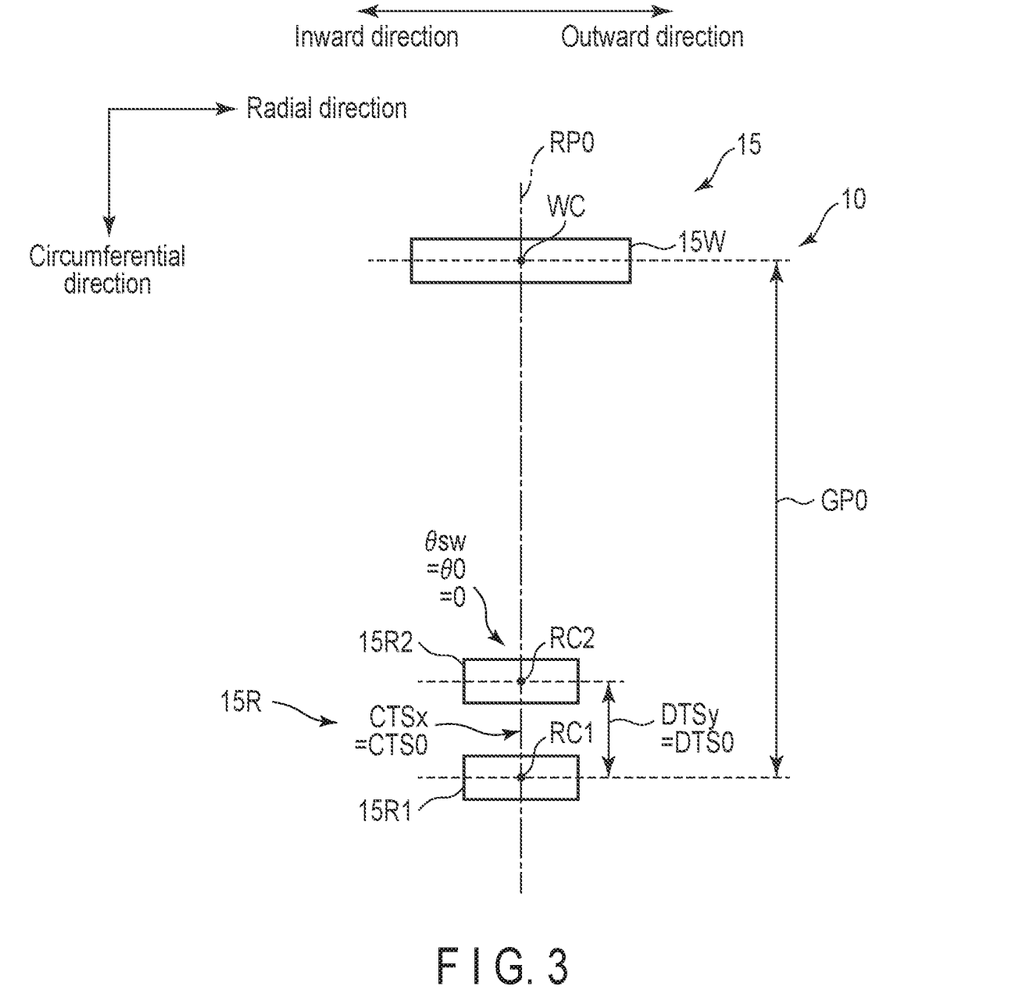
FIG. 3 is a schematic diagram showing an example of the geometric arrangement of a write head and the two read heads when the read head is disposed at a reference position.

FIG. 3 is a schematic diagram showing an example of the geometric arrangement of the write head 15W and the two read heads 15R1 and 15R2 when the read head 15R1 is disposed at the reference position RP0. In FIG. 3, the read head 15R1 corresponds to the main read head 15R1 and the read head 15R2 corresponds to the sub read head 15R2. FIG. 3 shows a center WC of the write head 15W, a center RC1 of the read head (main read head) 15R1, and a center RC2 of the read head (sub read head) 15R2. Hereinafter, the interval in the circumferential direction between the center RC1 of the read head 15R1 and the center RC2 of the read head 15R2 may be referred to as a down track separation (DTS). Further, the interval in the radial direction between the center RC1 of the read head 15R1 and the center RC2 of the read head 15R2 may be referred to as a cross track separation (CTS). In FIG. 3, the down track separation when the main read head 15R1 is disposed at a particular radial position is indicated by DTSy, and the cross track separation when the main read head 15R1 is disposed at a particular radial position is indicated by CTSx. Further, in FIG. 3, the skew angle of the head 15 (the write head 15W and the read head 15R) when the main read head 15R1 is disposed at a particular radial position is indicated by θsw. Hereinafter, for convenience of explanation, the "center of the write head" may be simply referred to as the "write head", and the "center of the read head" may be simply referred to as the "read head".

In the example shown in FIG. 3, when the main read head 15R1 is disposed at a reference position RP0, the head 15 is tilted in the circumferential direction at a skew angle θsw=θ0 (=0). In other words, when the main read head 15R1 is disposed at the reference position RP0, the head 15 is not tilted in the circumferential direction. In FIG. 3, when the main read head 15R1 is disposed at the reference position RP0, the write head 15W, the main read head 15R1 and the sub read head 15R2 are disposed along the circumferential direction. In this case, the main read head 15R1 and the sub read head 15R2 are not shifted in the radial direction. In the example shown in FIG. 3, when the main read head 15R1 is disposed at the reference position RP0, the main read head 15R1 and the sub read head 15R2 are shifted in the radial direction by the cross track separation CTSx=CTS0 (=0). When the main read head 15R1 is disposed at the reference position RP0, the write head 15W and the read head 15R (main read head 15R1 and sub read head 15R2) may be shifted in the radial direction. Further, when the main read head 15R1 is disposed at the reference position RP0, the main read head 15R1 and the sub read head 15R2 may be shifted in the radial direction.

In the example shown in FIG. 3, when the main read head 15R1 is disposed at the reference position RP0, the write head 15W and the main read head 15R1 are away from each other in the circumferential direction at an interval GP0. When the main read head 15R1 is disposed at the reference position RP0, the main read head 15R1 and the sub read head 15R2 are away from each other in the circumferential direction with the down track separation DTSy=DTS0.

Figure 4:
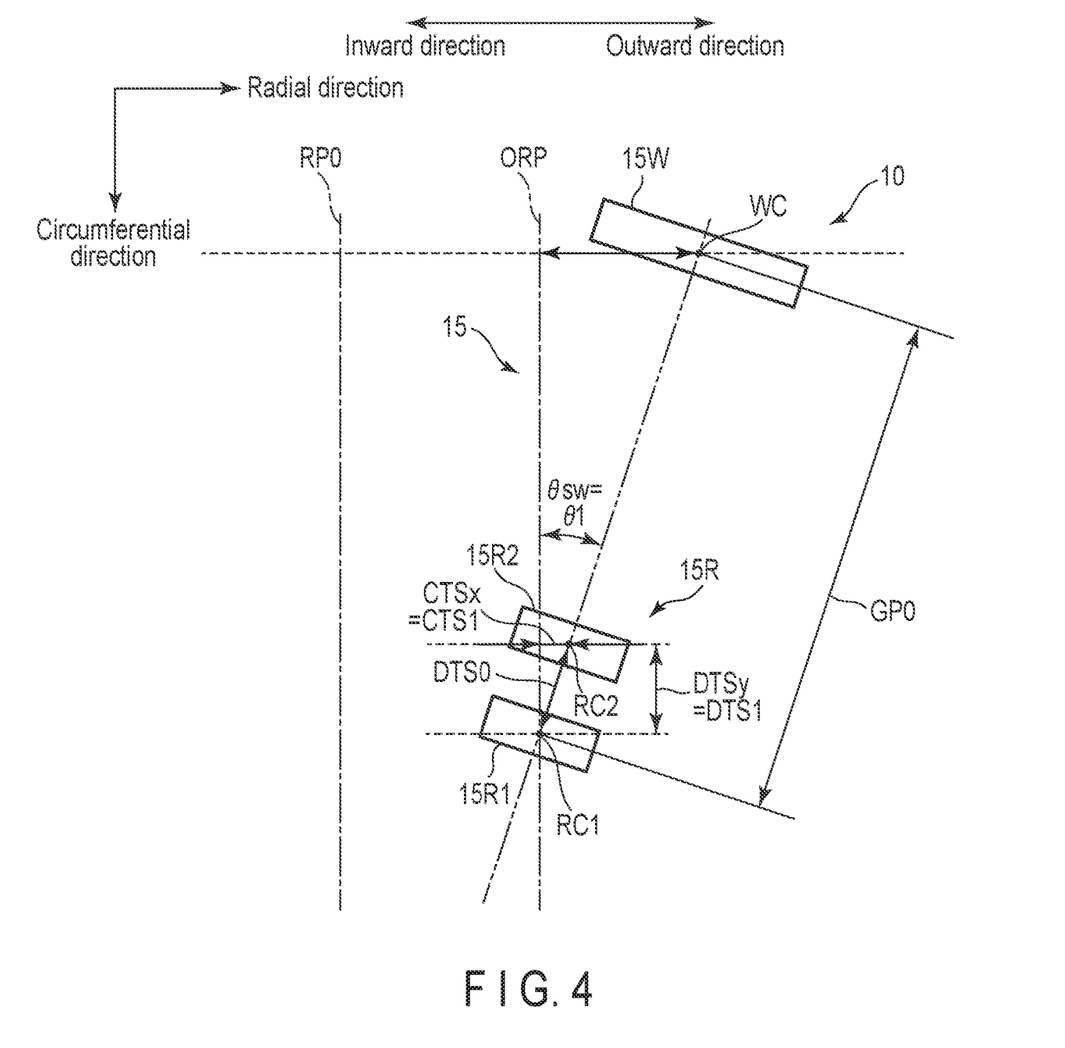
FIG. 4 is a diagram showing an example of the geometric arrangement of the write head and the two read heads when the read head is positioned at the radial position.

FIG. 4 is a diagram showing an example of the geometric arrangement of the write head 15W and the two read heads 15R1 and 15R2 when the read head 15R1 is disposed at the radial position ORP.

In the example shown in FIG. 4, when the main read head 15R1 is disposed at the radial position ORP, the head 15 is tilted outward in the circumferential direction at the skew angle θsw=θ1. In FIG. 4, when the main read head 15R1 is disposed at the radial position ORP, the write head 15W, the main read head 15R1, and the sub read head 15R2 are shifted outward in the circumferential direction. In this case, the main read head 15R1 and the sub read head 15R2 are shifted in the radial direction. In the example shown in FIG. 4, when the main read head 15R1 is disposed at the radial position ORP, the main read head 15R1 and the sub read head 15R2 are shifted outward in the radial direction by the cross track separation CTSx=CTS1.

In the example shown in FIG. 4, when the main read head 15R1 is disposed in the radial position ORP, the write head 15W and the main read head 15R1 are away from each other in the circumferential direction by the down track separation DTSy=DTS1 (=DTS0×cosθ1).

As in the case when the main read head 15R1 is disposed in the radial position ORP, when the main read head 15R1 is disposed in the radial position IRP, the write head 15W and the two read heads 15R1 and 15R2 can be tilted inward by a particular skew angle θsw. When the main read head 15R1 is disposed at the radial position IRP, the main read head 15R1 and the sub read head 15R2 can be shifted in the radial direction by a particular cross track separation CTSx. Further, when the main read head 15R1 is disposed at the radial position IRP, the main read head 15R1 and the sub read head 15R2 can be away from each other in the circumferential direction by a particular down track separation DTSx.

The driver IC 20 controls the driving of the SPM 12 and the VCM 14 according to the control of the system controller 130 (more specifically, the MPU 40 described later).

The head amplifier IC (preamplifier) 30 includes a read amplifier and a write driver. The read amplifier amplifies the read signal read from the disk 10 to output it to the system controller 130 (more specifically, a read/write (R/W) channel 60 to be described later). The write driver outputs, to the head 15, a write current corresponding to the write data output from the R/W channel 60.

The volatile memory 70 is a semiconductor memory from which stored data is lost when power supply is cut off. The volatile memory 70 stores data and the like necessary for processing in each part of the magnetic disk device 1. The volatile memory 70 is, for example, a dynamic random access memory (DRAM) or a synchronous dynamic random access memory (SDRAM).

The buffer memory 80 is a semiconductor memory that temporarily records data and the like transmitted and received between the magnetic disk device 1 and a host 100. It is to be noted that the buffer memory 80 may be formed integrally with the volatile memory 70. The buffer memory 80 is, for example, a DRAM, a static random access memory (SRAM), an SDRAM, a ferroelectric random access memory (FeRAM), a magnetoresistive random access memory (MRAM), or the like.

The nonvolatile memory 90 is a semiconductor memory that records data stored even when power supply is cut off. The nonvolatile memory 90 is, for example, a NOR type or NAND type flash read only memory (FROM).

The system controller (controller) 130 is implemented by using a large scale integrated circuit (LSI) referred to as the System-on-a-Chip (SoC) in which a plurality of elements is integrated on a single chip, for example. The system controller 130 includes a microprocessor (MPU) 40, a hard disk controller (HDC) 50, and the read/write (R/W) channel 60. The MPU 40, the HDC 50, and the R/W channel 60 are electrically connected to each other. The system controller 130 is electrically connected to, for example, the driver IC 20, the head amplifier IC 30, the volatile memory 70, the buffer memory 80, the nonvolatile memory 90, the host system 100, and the like.

The MPU 40 is a main controller that controls respective units of the magnetic disk device 1. The MPU 40 controls the VCM 14 via the driver IC 20 and performs positioning of the head 15. The MPU 40 controls the operation of writing data to the disk 10 and selects a storage destination of the data (hereinafter, may be referred to as write data) transferred from the host 100. Further, the MPU 40 controls the operation of reading data from the disk 10 and also controls the process of the data (hereinafter, may be referred to as read data) transferred from the disk 10 to the host 100. The MPU 40 executes the process based on the firmware. The MPU 40 is connected to each part of the magnetic disk device 1. For example, the MPU 40 is electrically connected to the HDC 50 and the R/W channel 60 to control these processes.

The HDC 50 controls data transfer between the host 100 and the R/W channel 60 in response to an instruction from the MPU 40 described later. The HDC 50 is electrically connected to, for example, volatile memory 70, the buffer memory 80, the nonvolatile memory 90, and the like.

The R/W channel 60 performs a signal process of read data and write data in response to an instruction from the MPU 40. The R/W channel 60 has a circuit or a function for measuring a signal quality of read data. The R/W channel 60 can change the setting of the main read head and the sub read head in the R/W channel 60 (hereinafter, may be referred to as read head internal setting). The read head internal setting corresponds to, for example, a setting indicating that one read head 15R among the plurality of read heads 15R is processed in the R/W channel 60 as a main read head and a sub read head. For example, the R/W channel 60 performs setting so as to treat a particular read head 15R among the plurality of read heads 15R as a main read head, and process at least one read head 15R other than the main read head among the plurality of read heads 15R as a sub read head.

When the main read head is positioned at a particular radial position, the R/W channel 60 can change the setting of the read head 15R set to be treated as the main read head so that the other read head 15R among the plurality of read heads 15R is treated as the main read head. The R/W channel 60 is electrically connected to, for example, the head amplifier IC 30, and the like.

Hereinafter, in the head 15, the head amplifier IC 30, and the controller 130, the system that transfers the read data read from the disk 10 to the host 100 may be referred to as a read system.

Figure 5:
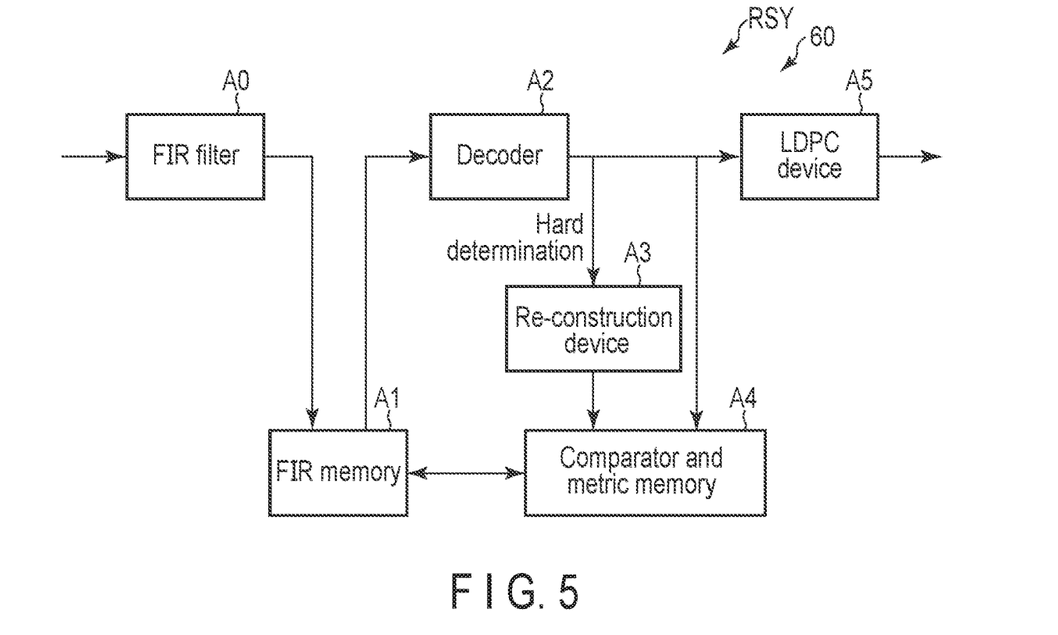
FIG. 5 is a block diagram showing a configuration example of a read system of an R/W channel according to the embodiment.

FIG. 5 is a block diagram showing a configuration example of a read system RSY of the R/W channel 60 according to the embodiment.

The R/W channel 60 includes the read system RSY. The read system RSY includes a finite impulse response (FIR) filter A0, a finite impulse response (FIR) memory A1, a decoder A2, a re-configuration or re-construction device A3, a comparator and metric memory A4, and a low density parity check (LDPC) device A5. The read system RSY may have a configuration other than the FIR filter A0, the FIR memory A1, the decoder A2, the re-construction device A3, the comparator and metric memory A4, and the LDPC device A5.

The FIR filter A0 optimizes (for example, averages or equalize) the waveform of the signal for each particular section (hereinafter, may be referred to as a segment) of the signal corresponding to the read data input from the head amplifier IC 30 or the like to output, to the FIR memory A1, the signal (hereinafter, may be referred to as an FIR sample signal or an FIR waveform) of the sample optimized (for example, averaged or equalized) for each segment.

The FIR memory A1 temporarily records the FIR sample signal for each segment output from the FIR filter A0. The FIR memory A1 temporarily records the optimum FIR sample signal (hereinafter, may be referred to as an optimum FIR sample signal) for each segment and the FIR sample signal for each segment corresponding to the read data. For example, the FIR memory A1 records the current optimum FIR sample signal for each segment (hereinafter, may be referred to as a current optimum FIR sample signal) and the FIR sample signal (hereinafter, may be referred to as a new FIR sample signal) for each segment corresponding to the newly read data. FIR memory A1 compares the current optimum FIR sample signal with the new FIR sample signal for each segment to newly select the optimum FIR sample signal (hereinafter, may be referred to as a new optimum FIR sample signal) for each segment from the current optimum FIR sample signal for each segment and the new FIR sample signal for each segment. The FIR memory A1 performs a process (hereinafter, may be referred to as an FIR signal joining process, an FIR signal synthesis process, a joining process, or a synthesis process) of generating (or acquiring) an optimum FIR sample (hereinafter, may be referred to as a synthesis FIR sample signal) obtained by joining the optimum FIR sample signal for each selected segment (or synthesized). For example, the FIR memory A1 selects the optimum FIR sample signal for each segment according to the output from the comparator and metric memory A4 described later to generate the synthesis FIR sample signal obtained by joining the optimum FIR sample signal for each segment selected by the FIR signal joining process. The FIR memory A1 outputs the synthesis FIR sample signal to the decoder A2. Further, the FIR memory A1 outputs the current optimum FIR sample signal for each segment and the new FIR sample signal for each segment to the comparator and metric memory A4. The FIR memory A1 may output the synthesis FIR sample signal to the comparator and metric memory A4. Further, the FIR memory A1 may output the current optimum FIR sample signal for each segment and the new FIR sample signal for each segment to the decoder A2. Hereinafter, the optimum FIR sample signal, the current optimum FIR sample signal, the new optimum FIR sample signal, the new FIR sample signal, etc., each may be referred to as a FIR sample signal, and the optimum FIR sample signal, the current optimum FIR sample signal, the new optimum FIR sample signal, the new FIR sample signal, and the like may be collectively referred to as the FIR sample signal.

The decoder A2 performs a decoding process on the synthesis FIR sample signal input from the FIR memory A1. The decoder A2 outputs, to the LDPC device A5, the synthesis FIR sample signal (hereinafter, may be referred to as a decoded signal) on which the decoding process is performed. The decoder A2 executes a hard determination process on the decoded signal to output, to the re-construction device A3, a signal (hereinafter, may be referred to as a hard determination signal) obtained by executing the hard determination process on the decoded signal. The decoder A2 performs a log likelihood ratio (LLR) process on the decoded signal to output, to the comparator and metric memory A4, a signal (hereinafter, may be referred to as an LLR signal) obtained by performing the LLR process on the decoded signal.

The re-construction device A3 performs a re-construct process on the hard determination signal to output, to the comparator and metric memory A4, a hard determination signal (hereinafter, may be referred to as a re-construction signal) on which the re-construct process is performed.

The comparator and metric memory A4 records the current optimum FIR sample signal for each segment and the new FIR sample signal for each segment. The comparator and metric memory A4 calculates the metric or the measured value corresponding to the signal to noise ratio (SNR) for each segment based on the LLR signal, the re-construction signal, and the FIR sample signal (for example, the new FIR sample signal) to record the calculated metric for each segment. The comparator and metric memory A4 compares the metrics for each window to select the optimum metric (hereinafter, may be referred to as an optimum metric). The window may correspond to, for example, one segment or may correspond to a plurality of segments. For example, the comparator and metric memory A4 calculates a metric (hereinafter, may be referred to as a new metric) corresponding to the square error between the re-construction signal and the FIR sample signal for each segment to record a new metric for each segment. Here, the metric corresponding to the square error between the re-construction signal and the FIR sample signal corresponds to the difference between the ideal value and the observed value. The metric may correspond to the absolute value of the LLR signal. LLR (LLR signal) is in the range of $-\infty$ to $+\infty$. The comparator and metric memory A4 calculates the average value of the new metric for each window (hereinafter, may be simply referred to as a new metric), for example, based on the metric for each segment to record the new metric for each window. The comparator and metric memory A4 compares, for each window, a new metric for each window with an average value of the current optimum metric (hereinafter, may be referred to as a current optimum metric) for each window to select the average value of the new optimum metric (hereinafter, may be simply referred to as a new optimum metric) for each window from the new metric for each window and the current optimum metric for each window. The comparator and metric memory 4 performs a process (hereinafter, may be referred to as a metric joining process, a metric synthesis process, a joining process, or a synthesis process) of generating (or acquiring) the optimum metric (hereinafter, may be referred to as a synthesis metric) obtained by joining the optimum metric (new optimum metric) for each selected window (or synthesized). Hereinafter, the new metric, the optimum metric, the current optimum metric, the new optimum metric, etc., may be referred to as respective metrics, and the new metric, the optimum metric, the current optimum metric, the new optimum metric, etc., may be collectively referred to as a metric. In addition, the average value of the metric for each window (or segment) may be simply referred to as a metric. The comparator and metric memory A4 output the synthesis metric to the FIR memory A1.

The LDPC device A5 performs the LDPC process on the decoded signal input from the decoder A2 to output, to the HDC 50, the decoded signal (hereinafter, may be referred to as an LDPC signal) obtained by performing the LDPC process.

The system controller 130 selects the main read head 15R from the plurality of read heads 15R. For example, the system controller 130 selects, as the main read head, the read head 15R1 among the read heads 15R1 and 15R2, and selects, as the sub read head, the read head 15R2 among the read heads 15R1 and 15R2. Further, for example, the system controller 130 selects, as the main read head, the read head 15R2 among the read heads 15R1 and 15R2, and selects, as the sub read head, the read head 15R1 among the read heads 15R1 and 15R2.

For example, the system controller 130 selects, as the sub read head, the read head 15R1, among the read heads 15R1 and 15R2, in which the characteristics, for example, the characteristics (hereinafter, may be referred to as BER characteristics) corresponding to the bit error rate (BER) during a read process are best, and selects, as the main read head, the read head 15R2, among the read heads 15R1 and 15R2, in which the BER characteristics are not best. Further, for example, the system controller 130 selects, as the sub read head, the read head 15R2, among the read heads 15R1 and 15R2, in which the BER characteristics are best, and selects, as the main read head, the read head 15R1, among the read heads 15R1 and 15R2, in which the BER characteristics are not best. The system controller 130 may select, as the main read head, the read head, among the plurality of read heads, in which the BER characteristics are best, and may select, as the sub read head, the read head, among the plurality of read heads, in which the BER characteristics are not best.

For example, when selecting, as the main read head 15R, the read head 15R, among the plurality of read heads 15R, in which the BER characteristics are not best, and selecting, as the sub read head, the read head 15R, among the plurality of read heads 15R, in which the BER characteristics are best, the system controller 130 disposes the main read head at a particular radial position of a particular track, and disposes the sub read head at a radial position where the SNR is smaller than an SNR when the sub read head is disposed at the radial position at which the main read head is disposed to read the track when the track is read. In one example, when selecting, as the main read head 15R, the read head 15R, among the plurality of read heads 15R, in which the BER characteristics are not best, and selecting, as the sub read head, the read head 15R, among the plurality of read heads 15R, in which the characteristic BER characteristics are best, the system controller 130 disposes the main read head in the track center of a track in the track in which a radially adjacent track (hereinafter, may be referred to as an adjacent track) is squeezed, shifted, close, or overlapped, and disposes the sub read head at a radial position on the adjacent track side.

When determining that the data cannot be read or cannot be read normally, the system controller 130 performs a read retry (or may be referred to as a read retry process) to read the same data again. When performing a read retry on a particular track, the system controller 130 changes the main read head and the sub read head of the plurality of read heads 15R. Further, when performing a read retry on a particular track, the system controller 130 changes the read head internal setting.

For example, when determining that a particular sector of a particular track cannot be read or cannot be read normally, the system controller 130 performs a read retry on a track including a sector (hereinafter, may be referred to as a read retry sector) that is determined that the sector cannot be read or cannot be read normally. While changing the main read head and the sub read head among the plurality of read heads 15R, the system controller 130 disposes the read head 15R (main read head) at a plurality of radial positions within the range of the track width of this track, and repeats a read retry on this track. In other words, while changing the main read head and the sub read head among the plurality of read heads 15R, the system controller 130 shifts (or offset) the read head 15R (main read head) by a plurality of radial shift amounts (or offset amounts) in the radial direction from the track center of this track, and repeats the read retry on this track. When disposing the main read heads at a plurality of radial positions within the range of the track width of a particular track to perform a read retry, the system controller 130 performs a read retry on this track while changing the read head internal setting and switching the setting for the main read head and the sub read head in the R/W channel 60. In one example, the system controller 130 uses the parameters stored in the Tap coefficients in the FIR filter corresponding to the main read head in the R/W channel 60 and sets all Tap coefficients in the FIR filter corresponding to the sub read head to zero to change the read head internal setting to switch the setting for the main read head and sub read head setting in the R/W channel 60. Also, in one example, the system controller 130 replaces the delay amount in the circumferential direction corresponding to the main read head with the delay amount in the circumferential direction corresponding to the sub read head to change the read head internal setting to switch the setting for the main read head and sub read head setting in the R/W channel 60. In this way, in the TDMR type disk device 1, by changing the read head internal setting of the R/W channel 60 and switching the setting for the main read head and the sub read head in the R/W channel 60 to read retry the particular track, good BER may be obtained due to the inter track interference cancellation (ITIC) effect when reading data.

When performing a read retry on a particular track, the system controller 130 disposes the heads 15 at a plurality of radial positions while changing the main read head and sub read head of the a plurality of read heads 15R, and selects the optimum FIR sample signal for each segment from a plurality of FIR sample signals for each segment corresponding to the data read while changing the internal setting of the read head to generate a synthesis FIR sample signal obtained by joining the optimum FIR sample signal for each selected segment. The system controller 130 performs an LDPC process on the decoded signal obtained by decoding (or decoding) the generated synthesis FIR sample signal to output the LDPC signal, as read data, obtained by performing the LDPC process via the HDC 50 to the host 100 or the like.

Figure 6:
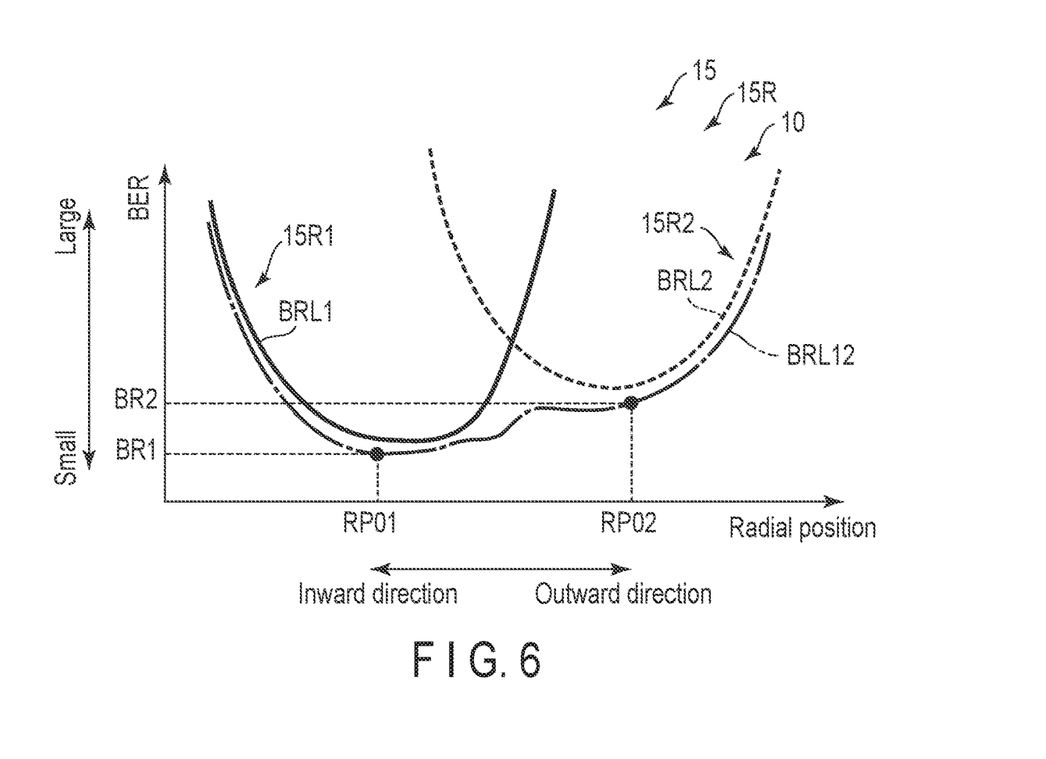
FIG. 6 is a schematic diagram showing an example of the BER characteristics of the read head.

FIG. 6 is a schematic diagram showing an example of the BER characteristics of the read heads 15R1 and 15R2. In FIG. 6, the vertical axis represents the error rate, for example, BER, and the horizontal axis represents the radial position. In FIG. 6, BER increases toward the tip of the large arrow and decreases toward the tip of the small arrow. BER BR1 and BR2 are shown at the vertical axis of FIG. 6. BER BR2 is larger than BER BR1. In FIG. 6, the radial position advances outward direction as it goes toward the tip of the outward arrow, and advances inward direction as it goes toward the tip of the inward arrow. Radial positions RP01 and RP02 are shown at the horizontal axis in FIG. 6. The radial position RP01 is located inward the radial position RP02. In other words, the radial position RP02 is located outward the radial position RP01. FIG. 6 shows the BER change BRL1 when the read head 15R1 is positioned at the radial position RP01 and this track is read, the BER change BRL2 when the read head 15R2 is positioned at the radial position RP02 and this track is read, and the BER change BRL12 when the BER change BRL1 and the BER change BRL2 are combined. The BER change BRL1 changes in a downwardly convex parabolic shape that has the apex at the radial position RP01. The BER change BRL2 changes in a downwardly convex parabolic shape that has the apex at the radial position RP02. The BER change BRL12 decreases toward the radial position RP01 from a position inward the radial position RP01 in a parabolic shape, gradually increases from the radial position RP01 toward the radial position RP02, and increases outward the radial position RP02 in a parabolic shape.

In the example shown in FIG. 6, the BER change BRL1 smaller in BER than the BER change BRL2. In other words, the BER characteristics of the read head 15R1 is better than the BER characteristic of the read head 15R2. The BER characteristic of the read head 15R2 may be better than the BER characteristic of the read head 15R1.

Figure 7:
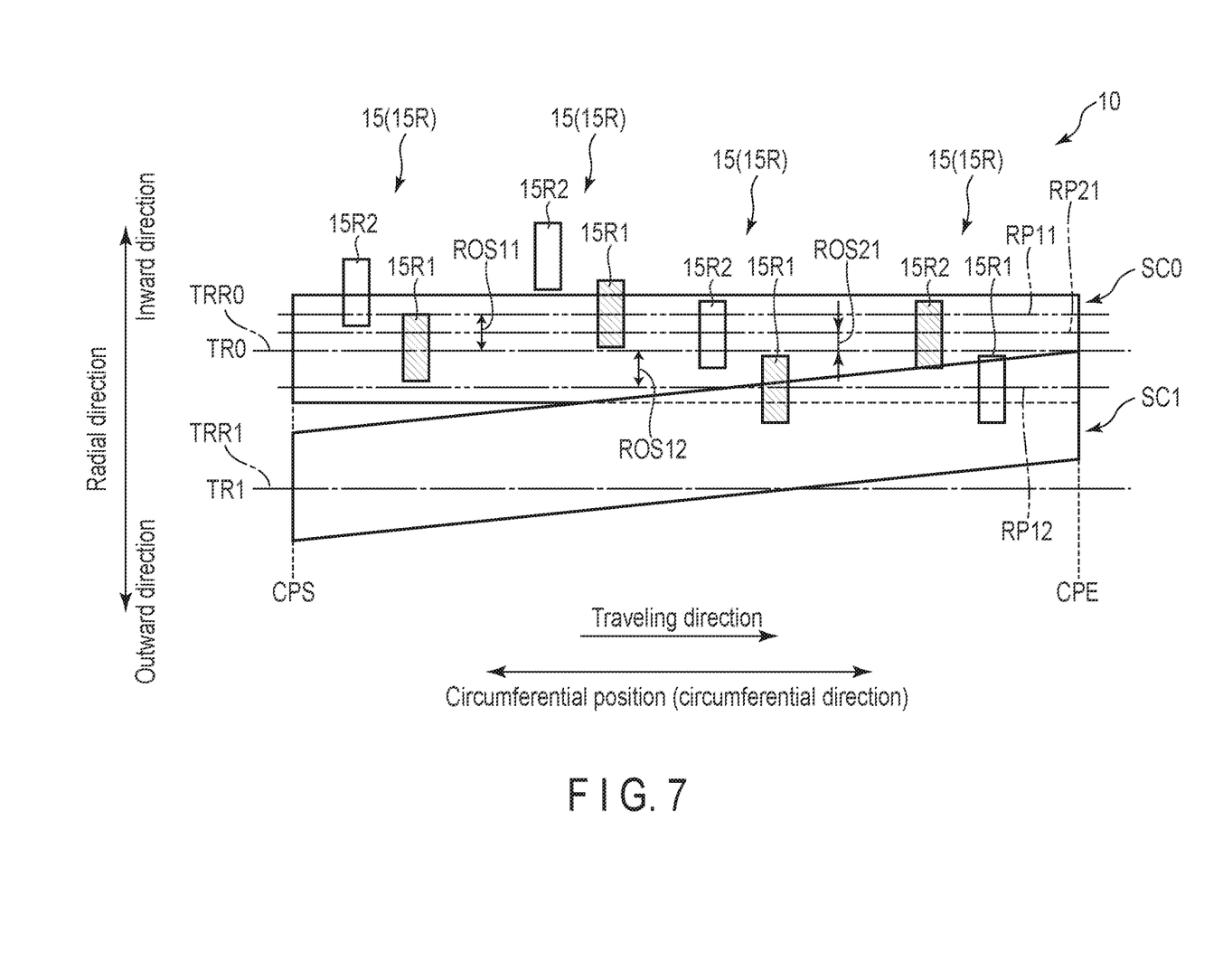
FIG. 7 is a schematic diagram showing an example of a read retry process according to the embodiment.

FIG. 7 is a schematic diagram showing an example of the read retry process according to the present embodiment. As shown in FIG. 7, the direction in which the head 15 advances with respect to the disk 10 at the circumferential position (circumferential direction), that is, the read/write direction, may be referred to as a traveling direction. FIG. 7 shows the circumferential position CPS and CPE. FIG. 7 shows a track TR0 and a track TR1 written outward the track TR0. The track TR0 and the track TR1 are adjacent to each other. The track TR0 is written by the write head 15W along the target path (radial position) TRR0. FIG. 7 shows a sector SC0 of the track TR0. In FIG. 7, the sector SC0 may be a read retry sector. In FIG. 7, the sector SC0 of the track TR0 extends in a strip shape along the circumferential direction from a circumferential position CPS to a circumferential position CPE. In FIG. 7, the sector SC0 is shown to extend linearly in the circumferential direction for convenience of explanation, but is actually curved along the shape of the disk 10. The sector SC0 is disposed in a circle along the disk 10. The sector SC0 may have a wavy shape extending in the circumferential direction while fluctuating in the radial direction.

FIG. 7 shows a sector SC1 of the track TR1. In FIG. 7, the sector SC1 is written by the write head 15W along the target path (radial position) TRR1 and is squeezed or shifted inward as it goes to the traveling direction. In other words, the sector SC1 is written shifted from the target path (radial position) TRR1 toward the track TR0 as it goes to the traveling direction. The sector SC1 is not substantially shifted from the target path (radial position) TRR1 at the circumferential position CPS, but is shifted from the target path (radial position) TRR1 at the circumferential position CPE to the extent that it overlaps part of the track TR0. The sector SC1 extends in a strip shape from the circumferential position CPS to the circumferential position CPE. In FIG. 7, the sector SC1 is shown to extend linearly for convenience of explanation, but is actually curved along the shape of the disk 10. The sector SC1 may have a wavy shape that extends while fluctuating in the radial direction.

In FIG. 7, the sector SC0 includes a radial position RP11 offset inward by an offset amount ROS11 from the target path (radial position) TRR0, a radial position RP12 offset outward by an offset amount ROS12 from the target path (radial position) TRR0, and a radial position RP21 offset inward by an offset amount ROS21 from the target path (radial position) TRR0. The radial position RP11 may be referred to as a path RP11 extending along the circumferential direction (hereinafter, also referred to as a radial path), the radial position RP12 may be referred to as a radial path RP12 extending along the circumferential direction, and the radial position RP21 may be referred to as a radial position RP21 extending along the circumferential direction. The radial position RP11 is located inward of the radial position RP21. In other words, the offset amount ROS11 is larger than the offset amount ROS21. The radial position RP11 and the radial position RP21 are located in the radial region where the sector SC0 and the sector SC1 do not overlap even when they extend in the traveling direction. In other words, the radial positions RP11 and RP21 are located inward the radial region where the sector SC0 and the sector SC1 overlap even when they extend in the traveling direction. The radial position RP12 is located in the radial region where the tracks TR0 and TR1 overlap in the circumferential position in the traveling direction, for example, in the circumferential position CPE. FIG. 7 shows the read head 15R1 disposed at the radial position TRR0 and the read head 15R2 when the read head 15R1 is disposed at the radial position TRR0. FIG. 7 shows the read head 15R1 disposed at the radial position RP11 and the read head 15R2 when the read head 15R1 is disposed at the radial position RP11. FIG. 7 shows the read head 15R1 disposed at the radial position RP12 and the read head 15R2 when the read head 15R1 is disposed at the radial position RP12. FIG. 7 shows the read head 15R2 disposed at the radial position RP21 and the read head 15R1 when the read head 15R2 is disposed at the radial position RP21. In FIG. 7, the main read head is shown in a rectangular shape filled with diagonal lines, and the sub read head is shown in a white (unfilled) rectangular shape.

The system controller 130 sets, for example, the read head 15R1 as the main read head and the read head 15R2 as the sub read head. In this case, the system controller 130, for example, disposes the read head 15R1 at the radial position TRR0 and reads the sector SC0.

In a case where performing a read retry on the track TR0 when the read head 15R1 is disposed at the radial position TRR0 and it is determined that the sector SC0 cannot be read or cannot be read normally, the system controller 130 may change the read head internal setting and may set the read head 15R1 to be treated as a sub read head and may set the read head 15R2 to be treated as a main read head in the R/W channel 60 to read the sector SC0. In other words, in a case where performing a read retry on track TR0 when the read head 15R1 is disposed at the radial position TRR0 and it is determined that the sector SC0 cannot be read or cannot be read normally, the system controller 130 may switch the read head internal setting for the read head 15R1 and the read head 15R2, and may set the read head 15R1 to be treated as a sub read head in the R/W channel 60, and may set, the read head 15R2 to be treated as the main read head in the R/W channel 60 to read the sector SC0.

In a case where performing a read retry on track TR0 when the read head 15R1 is disposed at the radial position TRR0 and it is determined that the sector SC0 cannot be read or cannot be read normally, the system controller 130 sets the read head 15R1 as the main read head, and sets the read head 15R2 as the sub read head. In this case, the system controller 130 disposes the read head 15R1 at the radial position RP11 and reads the sector SC0, for example.

In a case where performing a read retry on the track TR0 when the read head 15R1 is disposed at the radial position RP11 and it is determined that the sector SC0 cannot be read or cannot be read normally, the system controller 130 may change the read head internal setting and may set the read head 15R1 to be treated as a sub read head and may set the read head 15R2 to be treated as a main read head in the R/W channel 60 to read the sector SC0. In other words, in a case where performing a read retry on track TR0 when the read head 15R1 is disposed at the radial position RP11 and it is determined that the sector SC0 cannot be read or cannot be read normally, the system controller 130 may switch the read head internal setting for the read head 15R1 and the read head 15R2, and may set the read head 15R1 to be treated as a sub read head in the R/W channel 60, and may set, the read head 15R2 to be treated as the main read head in the R/W channel 60 to read the sector SC0.

In a case where performing a read retry on track TR0 when the read head 15R1 is disposed at the radial position TRR0 and it is determined that the sector SC0 cannot be read or cannot be read normally, the system controller 130 sets the read head 15R1 as the main read head, and sets the read head 15R2 as the sub read head. In this case, for example, the system controller 130 disposes the read head 15R1 located at the radial position RP12 to read the sector SC0 with the read head 15R2 located at the radial position RP21.

In a case where performing a read retry on track TR0 when the read head 15R1 is disposed at the radial position RP11 and it is determined that the sector SC0 cannot be read or cannot be read normally, the system controller 130 changes the read head internal setting, and sets the read head 15R1 to be treated as the sub read head in R/W channel 60 to locate the read head 15R1 at radial position RP12, and sets the read head 15R2 to be treated as the main read head in R/W channel 60 to dispose the read head 15R2 at the radial position RP21 to read the sector SC0.

Figure 8:
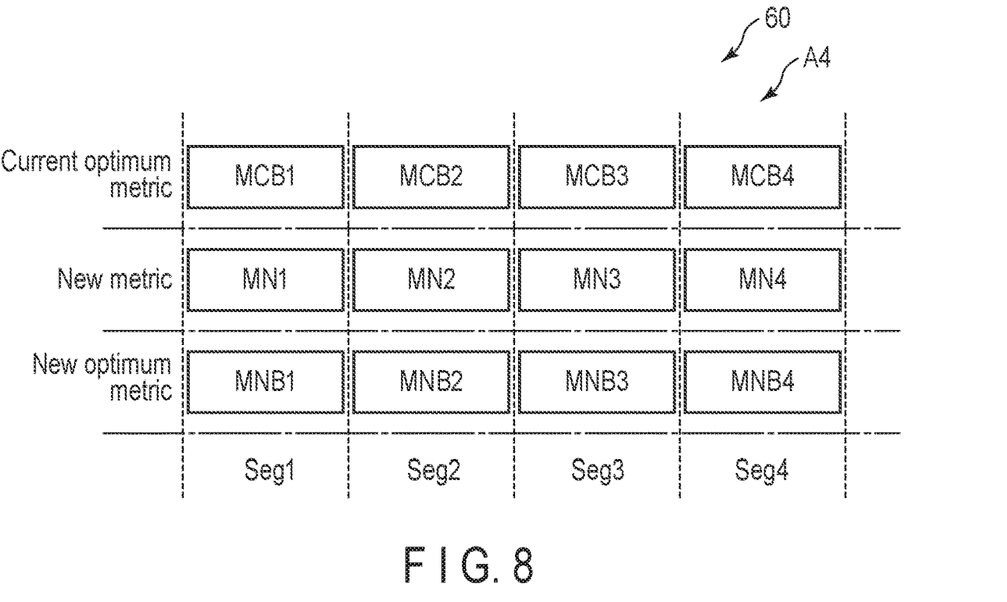
FIG. 8 is a schematic diagram showing an example of a process in a metric memory.

FIG. 8 is a schematic diagram showing an example of a process in a metric memory A4. As shown in FIG. 8, the metric memory A4 includes current optimum metric MCB1, MCB2, MCB3, and MCB4, new metrics MN1, MN2, MN3, and MN4, and new optimum metrics MNB1, MNB2, MNB3, and MNB4. The current optimum metric MCB1, the new metric MN1, and the new optimum metric MNB1 correspond to a segment Seg1. The current optimum metric MCB2, the new metric MN2, and the new optimum metric MNB2 correspond to a segment Seg2. The current optimum metric MCB3, the new metric MN3, and the new optimum metric MNB3 correspond to a segment Seg3. The current optimum metric MCB4, the new metric MN4, and the new optimum metric MNB4 correspond to a segment Seg4.

In a case where the head 15 is disposed at a radial position within the range of the track width of a particular track to read this track when performing a read retry, the system controller 130 divides each sector of this track into a plurality of windows, divides each window into at least one segment, and records the metric (for example, new metric) for each segment. The system controller 130 compares each current optimum metric corresponding to each segment with each new metric corresponding to each segment to select and record each new optimum metric from each current optimum metric and each new metric.

In the example shown in FIG. 8, the system controller 130 records the new metric MN1 corresponding to segment Seg1, and compares the current optimum metric MCB1 with the new metric MN1 to select and record the new optimum metric MNB1 from the current optimum metric MCB1 and the new metric MN1.

In the example shown in FIG. 8, the system controller 130 records the new metric MN2 corresponding to segment Seg2, and compares the current optimum metric MCB2 with the new metric MN2 to select and record the new optimum metric MNB2 from the current optimum metric MCB2 and the new metric MN2.

In the example shown in FIG. 8, the system controller 130 records the new metric MN3 corresponding to segment Seg3, and compares the current optimum metric MCB3 with the new metric MN3 to select and record the new optimum metric MNB3 from the current optimum metric MCB3 and the new metric MN3.

In the example shown in FIG. 8, the system controller 130 records the new metric MN4 corresponding to segment Seg4, and compares the current optimum metric MCB4 with the new metric MN4 to select and record the new optimum metric MNB4 from the current optimum metric MCB4 and the new metric MN4.

Figure 9:
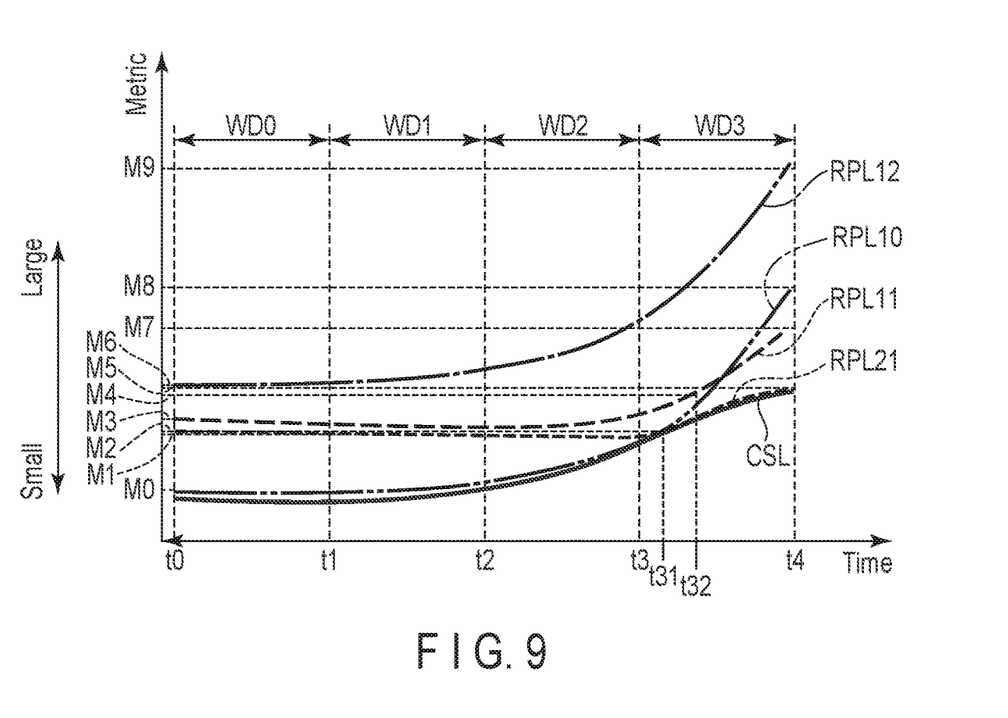
FIG. 9 is a schematic diagram showing an example of a metric joining process according to the embodiment.

FIG. 9 is a schematic diagram showing an example of the metric joining process according to the present embodiment. The example shown in FIG. 9 corresponds to FIG. 7. In FIG. 9, the vertical axis represents the metric and the horizontal axis represents the time. On the vertical axis of FIG. 9, the metric increases toward the tip of the large arrow and decreases toward the tip of the small arrow. The metrics M0, M1, M2, M3, M4, M5, M6, M7, M8, and M9 are shown at the vertical axis of FIG. 9. On the vertical axis of FIG. 9, the metric M1 is larger than the metric M0, the metric M2 is larger than the metric M1, the metric M3 is larger than the metric M2, the metric M4 is larger than the metric M3, the metric M5 is larger than the metric M4, and the metric M6 is larger than the metric M5. The metrics M1 and M2 may be the same, and the metrics M5 and M6 may be the same. The metric M7 is larger than the metric M6, the metric M8 is larger than the metric M7, and the metric M9 is larger than the metric M8. On the vertical axis of FIG. 9 in the metric corresponding to the square error between the re-construction signal and the FIR sample signal, for example, the smaller the metric, the better the signal quality, for example, the SNR. In the metric corresponding to the LLR, for example, the larger the metric, the better the signal quality, for example, the SNR. On the horizontal axis of FIG. 9, time elapses as it goes to the tip of the arrow. The horizontal axis of FIG. 9 shows times t0, t1, t2, t3, t31, t32, and t4. On the horizontal axis of FIG. 9, time t1 is the time after time t0, time t2 is the time after time t1 time t3 is the time after time t2, time t31 is the time after time t3, time t32 is the time after time t31, and time t4 is the time after time t32. On the horizontal axis of FIG. 9, a window WD0 corresponds to the period from time t0 to time t1, a window WD1 corresponds to the period from time t1 to time t2, a window WD2 corresponds to the period from time t2 to time t3, and a window WD3 corresponds to the period from time t3 to time t4. In FIG. 9, the period from time t1 to time t4 corresponds, for example, to the circumferential direction length of one sector of a particular track.

FIG. 9 shows a metric change (hereinafter, may be simply referred to as a metric change) RPL10 acquired by disposing the read head 15R1 at the radial position TRR0 to read the sector SC0 as shown in FIG. 7, a metric change RPL11 acquired by disposing the read head 15R1 at the radial position RP11 to read the sector SC0 as shown in FIG. 7, a metric change RPL12 acquired by disposing the read head 15R1 at the radial position RP12 to read the sector SC0 as shown in FIG. 7, and a metric change RPL21 acquired by changing the read head internal setting in a state of disposing the read head 15R1 at the radial position RP12 to locate the read head 15R2 at the radial position RP21, setting the read head 15R1 to be treated as the sub read head in the R/W channel 60, and setting the read head 15R2 is treated as the main read head in the R/W channel 60 to read the sector SC0 as shown in FIG. 7. The metric RPL10 is the metric M0 at time t0, the metric M3 at time t31, the metric M4 at time t32, and the metric M8 at time t4. The metric RPL11 is the metric M3 at time t0, the metric M4 at time t32, and the metric M7 at time t4. The metric RPL12 is the metric M6 at time t0 and the metric M9 at time t4. The metric RPL21 is the metric M1 at time t0, the metric M2 at time t31, and the metric M5 at time t4. In addition, FIG. 9 shows a synthesis metric change CSL (hereinafter, may be simply referred to as a synthesis metric) obtained by joining the optimum metrics in the windows WD0, WD1, WD2, and WD3.

In the example shown in FIG. 9, in a case where performing a read retry when reading the sector SC0 shown in FIG. 7, the system controller 130 disposes the read head 15R1 at the radial position TRR0 to read the sector SC0 to acquire the metric change RPL10 as shown in FIG. 7, disposes the read head 15R1 at the radial position RP11 to read the sector SC0 to acquire the metric change RPL11 as shown in FIG. 7, disposes the read head 15R1 at the radial position RP12 to read the sector SC0 to acquire the metric change RPL12 as shown in FIG. 7, changes the read head internal setting in a state of disposing the read head 15R1 at the radial position RP12 to locate the read head 15R2 at the radial position RP21, sets the read head 15R1 to be treated as the sub read head in the R/W channel 60, and sets the read head 15R2 to be treated as the main read head in the R/W channel 60 to read the sector SC0 to acquire the metric change RPL21 as shown in FIG. 7.

In the example shown in FIG. 9, the system controller 130 selects, as the optimum metric, a metric having the smallest metric change RPL10 among the plurality of metrics acquired by disposing the read heads 15R1 or 15R2 at a plurality of radial positions TRR0, RP11, RP12, and RP21 within the range of the sector width of the sector SC0 in window WD0. The system controller 130 selects, as the optimum metric, a metric having the smallest metric change RPL10 among the plurality of metrics acquired by disposing the read heads 15R1 or 15R2 at a plurality of radial positions TRR0, RP11, RP12, and RP21 within the range of the sector width of the sector SC0 in window WD1. The system controller 130 selects, as the optimum metric, a metric having the smallest metric change RPL10 among the plurality of metrics acquired by disposing the read heads 15R1 or 15R2 at a plurality of radial positions TRR0, RP11, RP12, and RP21 within the range of the sector width of the sector SC0 in window WD2. The system controller 130 selects, as the optimum metric, a metric having the smallest metric change RPL21 among the plurality of metrics acquired by disposing the read heads 15R1 or 15R2 at a plurality of radial positions TRR0, RP11, RP12, and RP21 within the range of the sector width of the sector SC0 in window WD3. The system controller 130 join a metric of the metric change RPL10 of the window WD0 selected as the optimum metric of the window WD0, a metric of the metric change RPL10 of the window WD1 selected as the optimum metric of the window WD1, a metric of the metric change RPL10 of the window WD2 selected as the optimum metric of the window WD2, and a metric of the metric change RPL21 of the window WD3 selected as the optimum metric of the window WD3 to acquire (or generate) the synthesis metric CSL.

When the metric corresponds to the absolute value of the LLR signal, the system controller 130 selects, as the optimum metric, the largest metric among the plurality of metrics acquired by disposing the read heads 15R1 or 15R2 at a plurality of radial positions within the range of the sector width of a particular sector in each window. The system controller 130 acquires (or generates) a synthesis metric by joining each optimum metric selected in each window.

Figure 10:
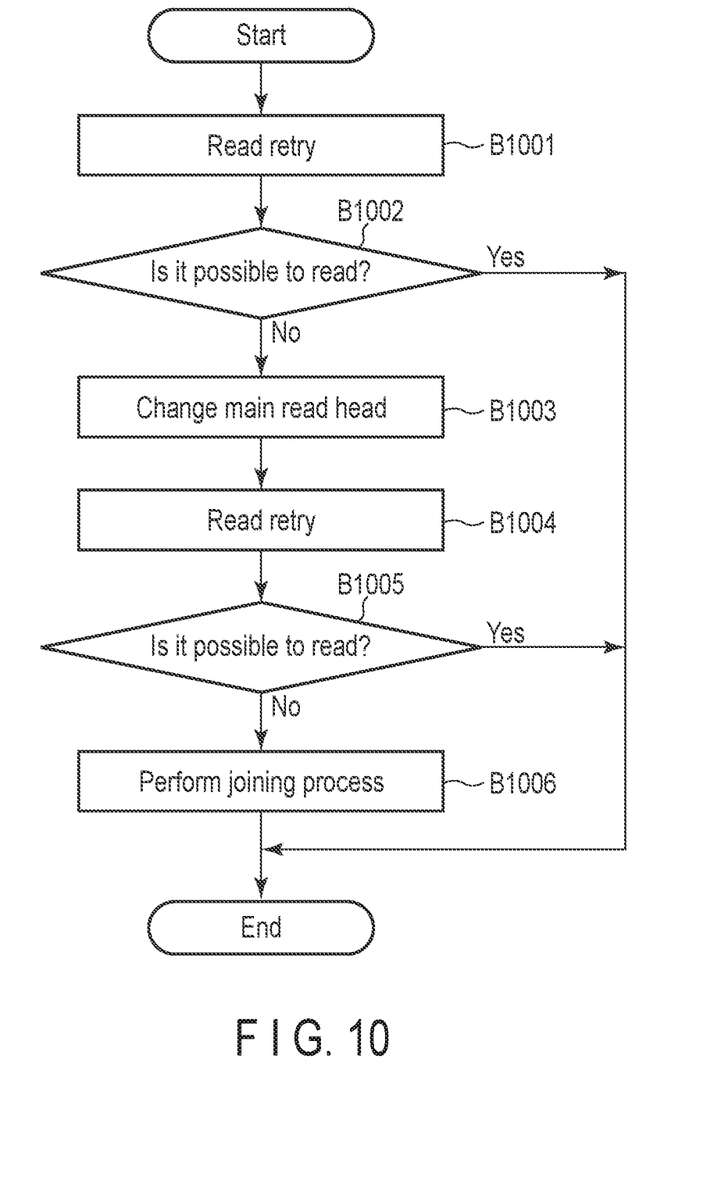
FIG. 10 is a flowchart showing an example of a read process according to the embodiment.

FIG. 10 is a flowchart showing an example of a read process according to the embodiment.

The system controller 130 read retries a particular track (B1001), and determines whether the particular track can be read (B1002). For example, when detecting a read retry sector on the particular track, the system controller 130 performs a read retry on this track and determines whether the read retry sector of this track can be read. When it is determined that the particular track can be read (YES of B1002), the system controller 130 ends the process. For example, when it is determined that the read retry sector of the particular track can be read, the system controller 130 ends the process. When it is determined that the particular track cannot be read (NO in B1002), the system controller 130 changes the main read head (B1003). In other words, when it is determined that the particular track cannot be read, the system controller 130 changes the main read head and the sub read head. For example, when it is determined that the read retry sector of the particular track cannot be read, the system controller 130 changes the main read head and the sub read head. The system controller 130 read retries the particular track (B1004), and determines whether the particular track can be read (B1005). For example, the system controller 130 read retries the read retry sector of the particular track, and determines whether the read retry sector of this track can be read. When it is determined that the particular track can be read (YES of B1005), the system controller 130 ends the process. For example, when it is determined that the read retry sector of the particular track can be read, the system controller 130 ends the process. When it is determined that the particular track cannot be read (NO in B1005), the system controller 130 performs the joining process (B1006) and ends the process. For example, when it is determined that the read retry sector of the particular track cannot be read, the system controller 130 performs the FIR signal joining process and ends the process.

Figure 11:
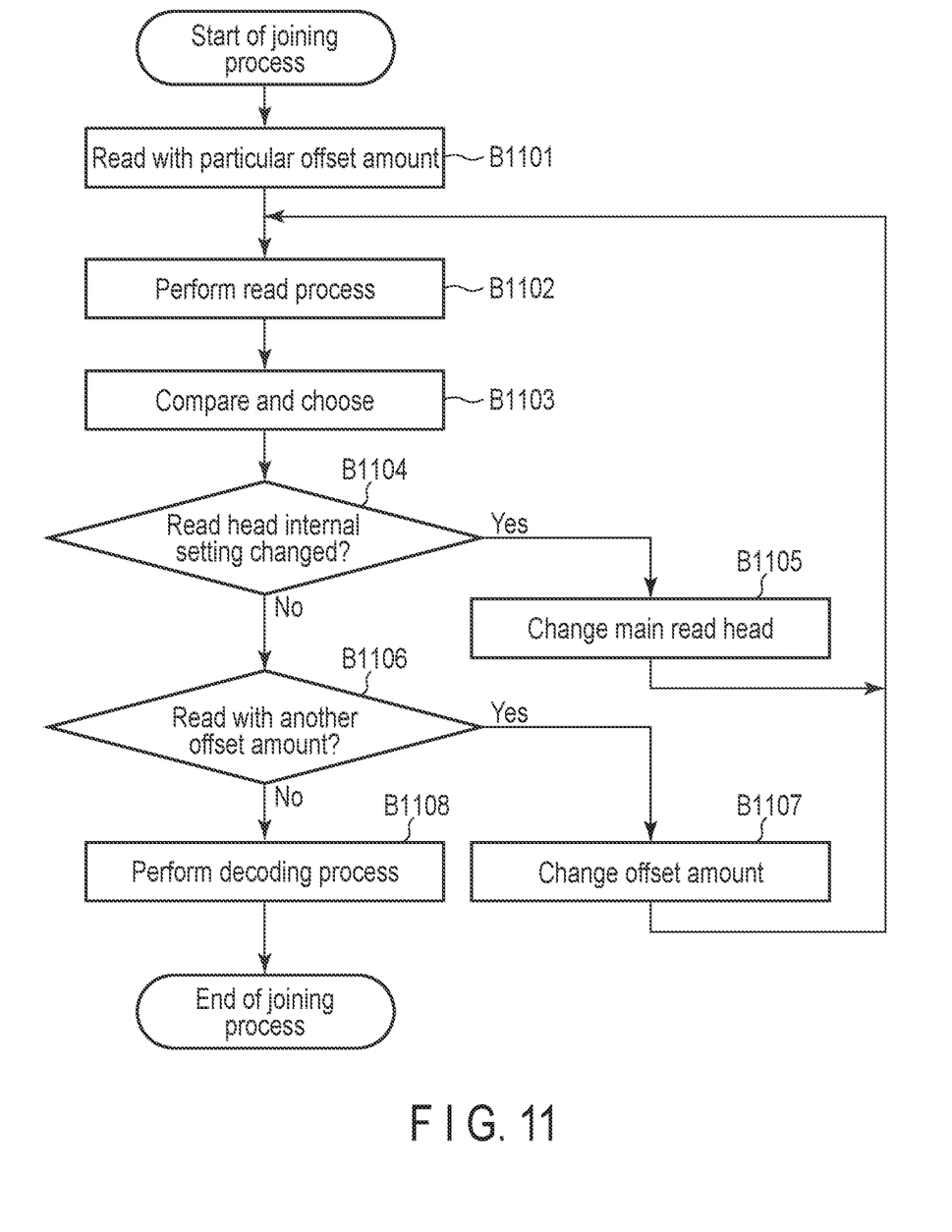
FIG. 11 is a flowchart showing an example of a joining process according to the embodiment.

FIG. 11 is a flowchart showing an example of a joining process according to the embodiment. FIG. 11 corresponds to the joining process shown in B1006 of FIG. 10.

The system controller 130 disposes the main read head with a particular offset amount (B1101), and reads a particular track with the main read head (B1102). In other words, the system controller 130 disposes the main read head at a particular radial position within the range of the track width of the particular track, and reads this track by the main read head. The system controller 130 disposes the main read head at the particular radial position of the particular track, compares the FIR sample signals for each segment corresponding to the read data (or sector), and selects the optimum FIR sample signal for each segment (B1103). In other words, the system controller 130 disposes the main read head at the particular radial position of the particular track, selects the new optimum FIR sample signal for each segment from the current optimum FIR sample signal for each segment and the new FIR sample signal for each segment corresponding to the data (or sector) read by the main read head, joins the new optimum FIR sample signal for each segment to generate the synthesis FIR sample signal.

The system controller 130 determines whether to change the read head internal setting (B1104). In other words, the system controller 130 determines whether to change the setting for the main read head and the sub read head in the R/W channel 60. When it is determined that the read head internal setting is changed (YES in B1104), the system controller 130 changes the main read head in the R/W channel 60 (B1105) and the process proceeds to B1102. In other words, when it is determined that the read head internal setting is changed, the system controller 130 switches (or changes) the setting for the main read head and the sub read head in the R/W channel 60, and the process proceeds to B1102. For example, when it is determined that the read head internal setting is changed, the system controller 130 changes the read head 15R to be treated as the main read head in the R/W channel 60, from the read head 15R1 to the read head 15R2, and changes the read head 15R to be treated as the sub read head in the R/W channel 60 from the read head 15R2 to the read head 15R1, and the process proceeds to B1102.

When it is determined that the read head internal setting is not changed (NO in B1104), the system controller 130 determines whether to read a particular track by the main read head with another offset amount (B1106). In other words, the system controller 130 disposes the main read head at another radial position in a particular track to determine whether to read this track. When it is determined that the main read head reads a particular track with another offset amount (YES in B1106), the system controller 130 changes the offset amount and the process proceeds to B1102. In other words, when it is determined that the main read head is disposed at another radial position to read the particular track by the main read head, the system controller 130 changes the radial position where the main read head is disposed and the process proceeds to B1102. When it is determined that the main read head does not read the particular track with another offset amount (NO in B1106), the system controller 130 performs a decoding process on the synthesis FIR sample signal (B1108) and ends the process. In other words, when the main read head is disposed at another radial position and the main read head determines that the particular track is not read, the system controller 130 performs a decoding process on the synthesis FIR sample signal and ends the process.

According to the present embodiment, the magnetic disk device 1 read retries a particular track. When determining that the particular track cannot be read, the magnetic disk device 1 changes the main read head and the sub read head in the plurality of read heads 15R, and read retries the track. The magnetic disk device 1 reads the particular track by a main read head with a particular offset amount. In other words, the magnetic disk device 1 disposes the main read head at a particular radial position within the range of the track width of the particular track, and reads the track by the main read head. The magnetic disk device 1 disposes the main read head at the particular radial position of the particular track, compares the metrics for each window corresponding to the read data, and selects the optimum metric for each window to generate a synthesis metric. The magnetic disk device 1 disposes the main read head at the particular radial position of the particular track according to the synthesis metric, compares the FIR sample signals for each segment corresponding to the read data, and selects the optimum FIR sample signal for each segment to generate a synthesis FIR sample signal. The magnetic disk device 1 determines whether to change the read head internal setting. When it is determined that the read head internal setting is changed, the magnetic disk device 1 changes the setting for the main read head and the sub read head in the R/W channel 60, and reads this track by the main read head. The magnetic disk device 1 changes the read head internal setting, compares the metrics for each window corresponding to the data read by the main read head, selects the optimum metric for each window to generate a synthesis metric. The magnetic disk device 1 disposes the main read head at the particular radial position of the particular track according to the synthesis metric, compares the FIR sample signals for each segment corresponding to the read data, and selects the optimum FIR sample signal for each segment to generate a synthesis FIR sample signal. The magnetic disk device 1 performs an LDCP process on the decoded signal obtained by decoding the synthesis FIR sample signal, and performs the read process. Therefore, the magnetic disk device 1 can improve the signal quality in the read process. Therefore, the magnetic disk device 1 can improve the quality of the read process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head including a write head that writes data to the disk and a first read head and a second read head that read data from the disk; and
   a controller that disposes the first read head at a first radial position of a first track of the disk in a radial direction to read the first track, changes a main read head which serves as a reference for positioning during a read process from the first read head to the second read head when read retrying the first track, disposes the second read head as the main read head at a second radial position different from the first radial position of the first track in the radial direction to read the first track, and changes an internal setting corresponding to the main read head to read the first track.

2. The magnetic disk device according to claim 1, wherein the controller changes the internal setting in a state where the second read head as the main read head is disposed at the second radial position, changes the main read head from the second read head to the first read head, and reads the first track with the first read head as the main read head.

3. The magnetic disk device according to claim 2, wherein when read retrying the first track as the main read head, the controller disposes the first read head at a third radial position different from the first radial position of the first track in the radial direction to read the first track.

4. The magnetic disk device according to claim 3, wherein when read retrying the first track as the main read head, the controller disposes the second read head at a fourth radial position different from the second radial position of the first track in the radial direction to read the first track.

5. The magnetic disk device according to claim 1, wherein the controller acquires a first signal for each first section corresponding to a first sector of the first track, compares a first signal for the each first section with a second signal for the each first section, and selects an optimum third signal for the each first section from the first signal for the each first section and the second signal for the each first section.

6. The magnetic disk device according to claim 5, wherein the controller decodes a fourth signal obtained by joining a third signal for the each first section.

7. The magnetic disk device according to claim 5, wherein the controller calculates a first metric for each second section based on the third signal for the each first section, compares the first metric for the each second section with a second metric for the second section, selects an optimum third metric for the each second section from the first metric for the each second section and the second metric for the each second section, and joins the third metric.

8. The magnetic disk device according to claim 7, wherein the first metric, the second metric, and the third metric each correspond to a signal to noise ratio.

9. The magnetic disk device according to claim 8, wherein the controller selects, as the third metric, a smaller metric among the first metric for the each second section and the second metric for the each second section.

10. The magnetic disk device according to claim 9, wherein the controller calculates a square error between a fifth signal and the third signal as the first metric.

11. The magnetic disk device according to claim 10, wherein the controller re-constructs a sixth signal on which a hard determination is made based on the first signal to generate the fifth signal.

12. The magnetic disk device according to claim 8, wherein the controller selects, as the third metric, a larger metric among the first metric for the each second section and the second metric for the each second section.

13. The magnetic disk device according to claim 12, wherein the controller calculates an absolute value of a log likelihood ratio as the first metric.

14. A magnetic disk device comprising:
a disk;
a head including a write head that writes data to the disk and a first read head and a second read head that read data from the disk; and
a read/write channel that, when a main read head which serves as a reference for positioning the head during a read process is changed from one of the first read head and the second read head to the other of the first read head and the second read head when read retrying a first track of the disk, changes an internal setting indicating that the one of the first read head and the second read head is set as the main read head.

15. A read processing method applied to a magnetic disk device including a disk, and a head including a write head that writes data to the disk and a first read head and a second read head that read data from the disk, the method comprising:
disposing the first read head at a first radial position of the first track of the disk in a radial direction to read a first track;
changing a main read head which serves as a reference for positioning during a read process from the first read head to the second read head when read retrying the first track;
disposing the second read head as the main read head at a second radial position different from the first radial position of the first track in the radial direction to read the first track; and
changing an internal setting corresponding to the main read head to read the first track.

16. The read processing method according to claim 15, comprising:
changing the internal setting in a state where the second read head as the main read head is disposed at the second radial position and changing the main read head from the second read head to the first read head; and
reading the first track with the first read head as the main read head.

17. The read processing method according to claim 16, comprising:
disposing the first read head at a third radial position different from the first radial position of the first track in the radial direction when read retrying the first track as the main read head to read the first track.

18. The read processing method according to claim 17, comprising:
disposing the second read head at a fourth radial position different from the second radial position of the first track in the radial direction when read retrying the first track as the main read head to read the first track.

19. The read processing method according to claim 15, comprising:
acquiring a first signal for each first section corresponding to a first sector of the first track;
comparing a first signal for the each first section with a second signal for the each first section; and
selecting an optimum third signal for the each first section from the first signal for the each first section and the second signal for the first section.

20. The read processing method according to claim 19, comprising:
decoding a fourth signal obtained by joining a third signal for the each first section.

* * * * *